(12) United States Patent
Tseng

(10) Patent No.: US 7,997,645 B2
(45) Date of Patent: Aug. 16, 2011

(54) HOLDING ASSEMBLY FOR A SEAT OF A BICYCLE

(75) Inventor: Peng-Yu Tseng, Taipei (TW)

(73) Assignees: Peng-Yu Tseng, Taipei (TW); Kuni Tseng, Taipei (TW)

( * ) Notice: Subject to any disclaimer, the term of this patent is extended or adjusted under 35 U.S.C. 154(b) by 229 days.

(21) Appl. No.: 12/408,798

(22) Filed: Mar. 23, 2009

(65) Prior Publication Data

US 2010/0237668 A1  Sep. 23, 2010

(51) Int. Cl.
*B60J 1/00* (2006.01)

(52) U.S. Cl. ............ 297/215.15; 297/215.14; 297/215.1

(58) Field of Classification Search .............. 297/195.1, 297/215.14, 215.15, 215.1
See application file for complete search history.

(56) References Cited

U.S. PATENT DOCUMENTS

| | | | | |
|---|---|---|---|---|
| 4,983,063 A | * | 1/1991 | Phillips | 403/4 |
| 5,190,346 A | * | 3/1993 | Ringle | 297/215.14 |
| 5,383,706 A | * | 1/1995 | Chen | 297/215.15 |
| 5,664,829 A | * | 9/1997 | Thomson et al. | 297/215.14 |
| 5,702,093 A | * | 12/1997 | Liao | 267/132 |
| 5,988,741 A | * | 11/1999 | Voss et al. | 297/215.15 |
| 6,702,376 B1 | * | 3/2004 | Shen | 297/215.15 |
| 7,562,932 B2 | * | 7/2009 | Chiang | 297/195.1 |
| 7,562,933 B1 | * | 7/2009 | Chao et al. | 297/215.13 |
| 7,621,595 B1 | * | 11/2009 | Chen | 297/215.15 |

* cited by examiner

*Primary Examiner* — David Dunn
*Assistant Examiner* — Erika Garrett
(74) *Attorney, Agent, or Firm* — Pai Patent & Trademark Law Firm; Chao-Chang David Pai

(57) ABSTRACT

A holding assembly for a seat of a bicycle has a securing base and an engaging block. The securing base has a connecting segment, an engaging segment, a securing hole and a securing bolt. The connecting segment has a connecting device connected with the seat of the bicycle. The engaging segment is formed on and protrudes from the bottom of the connecting segment and has an engaging recess having an inclined top surface. The securing bolt is slidably and rotatably mounted in the securing hole, extends into the engaging recess and has a threaded portion. The engaging block is moveably mounted in the engaging recess and has an inclined top surface abutting with the inclined top surface of the engaging recess and a threaded portion engaging the threaded portion on the securing bolt.

2 Claims, 6 Drawing Sheets

US 7,997,645 B2

HOLDING ASSEMBLY FOR A SEAT OF A BICYCLE

BACKGROUND OF THE INVENTION

1. Field of the Invention

The present invention relates to a holding assembly, and more particularly to a holding assembly for a seat of a bicycle.

2. Description of Related Art

A bicycle has a holding assembly for connecting a seat to a seat tube of a frame of the bicycle. A conventional holding assembly may comprise a C-shaped collar securely mounted a seat tube of a frame to hold a connecting tube securely connected to a seat in cooperation with a bolt.

However, the C-shaped collar cannot provide a secure holding effect to the connecting tube, so the seat with the connecting tube easily moves downward relative to the frame due to the weight of a rider. Additionally, the appearance of the bicycle is badly influenced due to the exposed C-shaped collar.

With reference to FIG. 6, another conventional holding assembly for a seat of a bicycle comprises a base (50), a holding bolt (52), multiple resilient engaging disks (54) and a securing nut (56). The base (50) is attached to a top of a seat tube on a frame of the bicycle and is connected securely to the seat with a connecting device. The holding bolt (52) is mounted rotatably through the base (50) and extends into the seat tube. The resilient engaging disks (54) are held in the seat tube and mounted around the holding bolt (52). The securing nut (56) is engaged the holding bolt (52) and abuts against the lowermost one of the engaging disks (54). When the holding bolt (52) is rotated, the securing nut (56) will be moved upward to push against the engaging disks (54). Consequently, the engaging disks (54) will be deformed to push against the inner surface of the seat tube, such that holding assembly can be securely held with the seat tube so as to connect the seat with the seat tube.

Although the holding bolt (52), the engaging disks (54) and the securing nut (56) of the conventional holding assembly are not exposed, the conventional holding assembly has a complicated structure and the cost for manufacturing and using the conventional holding assembly is high.

To overcome the shortcomings, the present invention tends to provide a holding assembly for a seat of a bicycle to mitigate or obviate the aforementioned problems.

SUMMARY OF THE INVENTION

The main objective of the invention is to provide a holding assembly for a seat of a bicycle and having a simplified structure. The holding assembly comprises a securing base and an engaging block. The securing base has a connecting segment, an engaging segment, a securing hole and a securing bolt. The connecting segment is formed at the top and has a connecting device mounted on the top of the connecting segment and connected with the seat of the bicycle. The engaging segment is formed on and protrudes from the bottom of the connecting segment and has an engaging recess defined in the outer surface of the engaging segment. The engaging recess has an inclined top surface. The securing hole is defined in the top of the securing base, extends through the connecting segment and into the engaging segment via the inclined top surface of the engaging recess and communicates with the engaging recess. The securing bolt is slidably and rotatably mounted in the securing hole, extends into the engaging recess and has a threaded portion. The engaging block is moveably mounted in the engaging recess and has an inclined top surface abutting with the inclined top surface of the engaging recess and a threaded portion engaging the threaded portion on the securing bolt.

Other objects, advantages and novel features of the invention will become more apparent from the following detailed description when taken in conjunction with the accompanying drawings.

DETAILED DESCRIPTION OF PREFERRED EMBODIMENT

Figure 1:
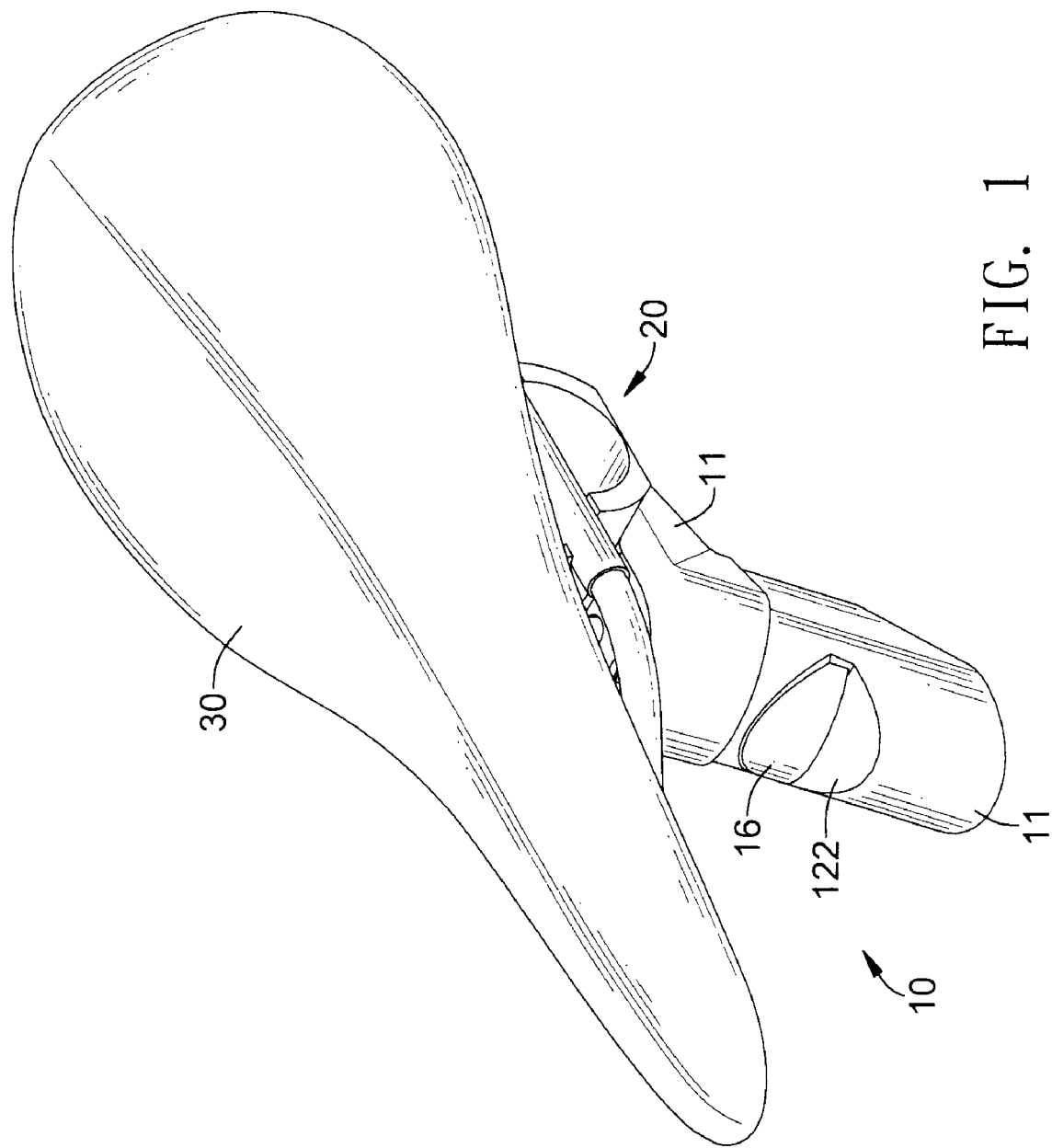
FIG. 1 is a perspective view of a seat with a holding assembly in accordance with the present invention.
Figure 2:
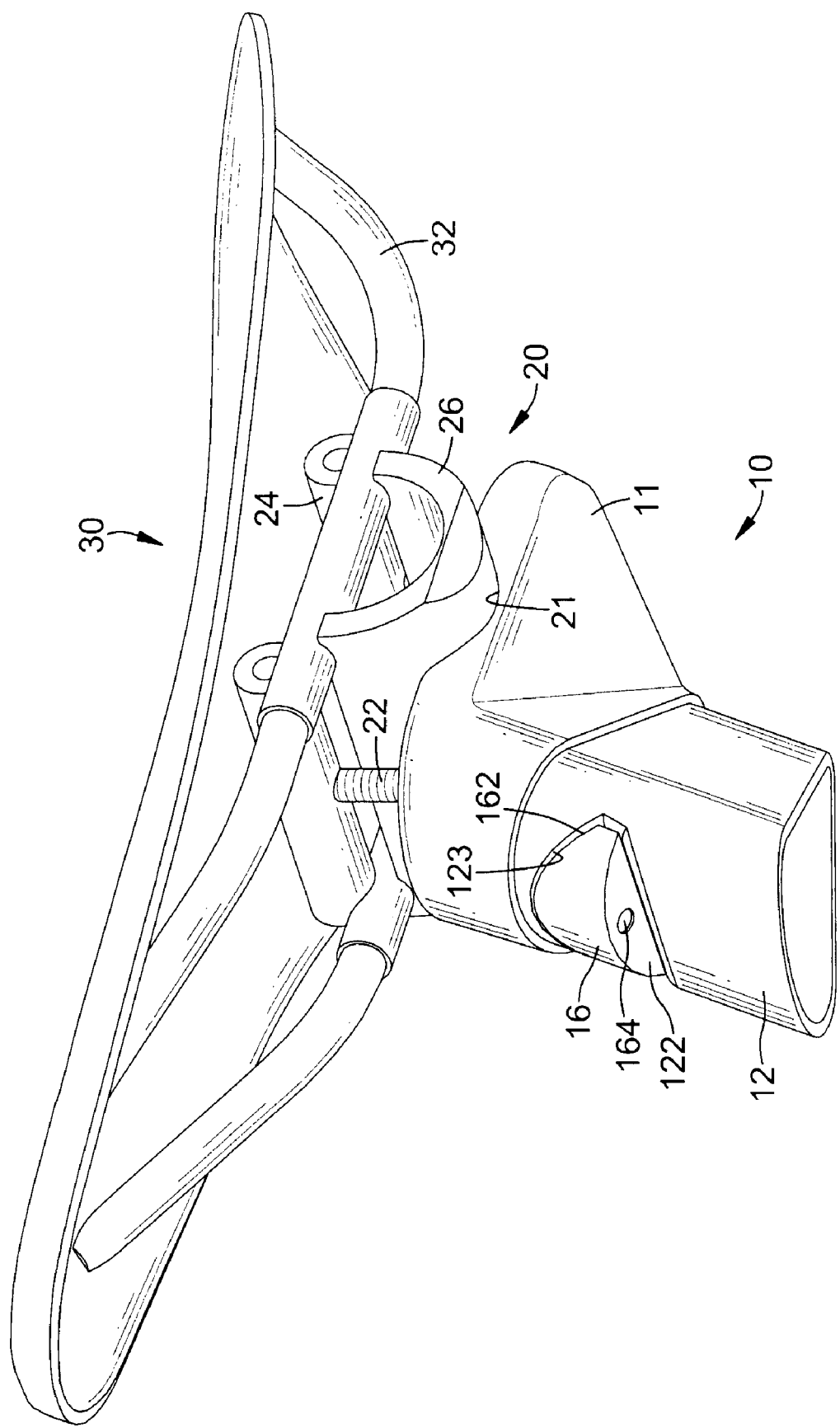
FIG. 2 is another perspective view of the seat with the holding assembly in FIG. 1.
Figure 3:
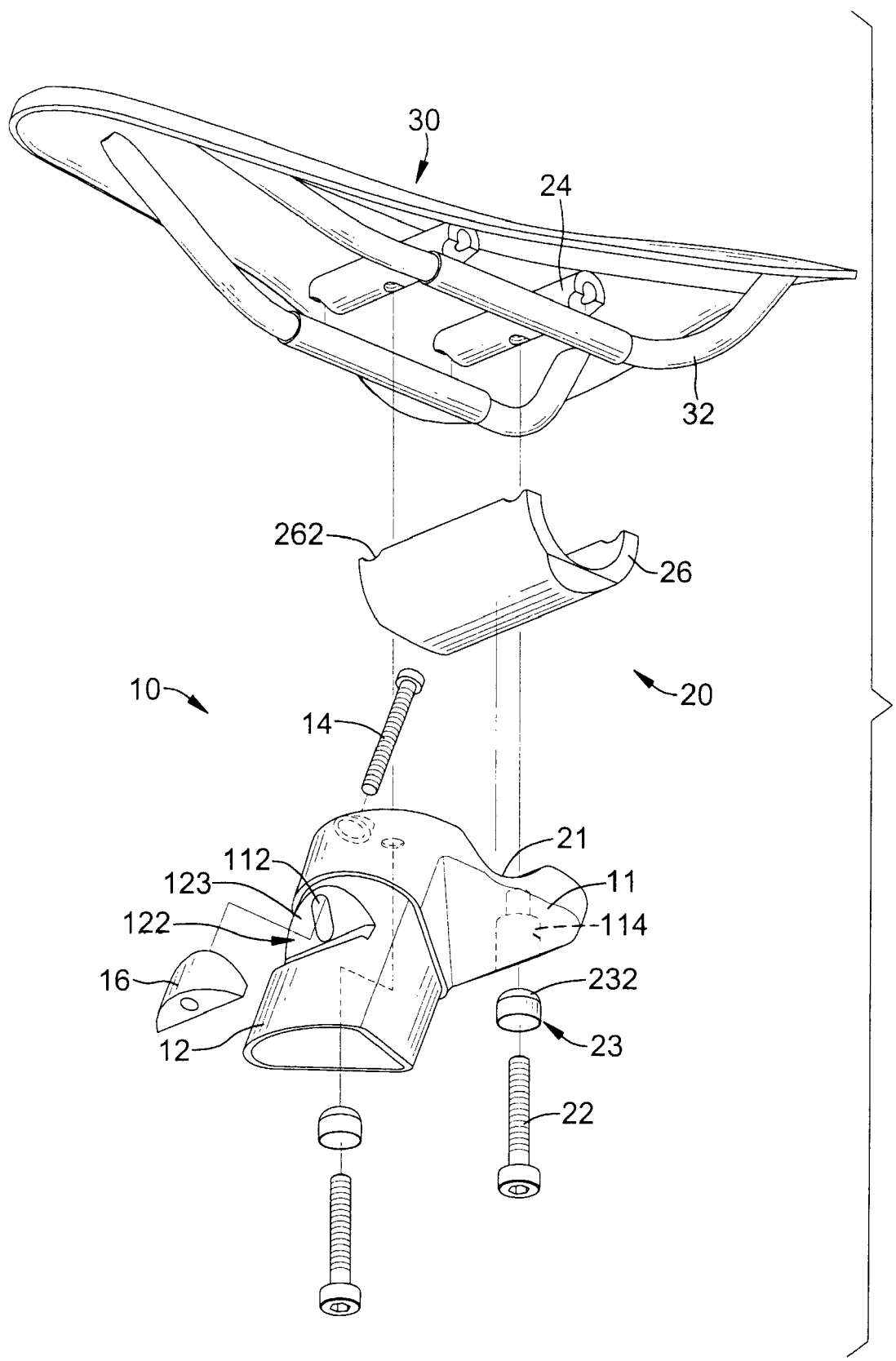
FIG. 3 is an exploded perspective view of the seat with the holding assembly in FIG. 1.

With reference to FIGS. 1 to 3, a holding assembly for a seat of a bicycle in accordance with the present invention comprises a securing base (10) and an engaging block (16). The securing base (10) is connected simultaneously to a seat (30) and a seat tube on a bicycle frame. The securing base (10) has a top, a connecting segment (11), an engaging segment (12), a securing hole (112) and a securing bolt (14). The connecting segment (11) is formed at the top of the securing base (10) and has a top, a bottom and a connecting device (20) adapted to connect with the seat (30) of the bicycle.

Figure 4:
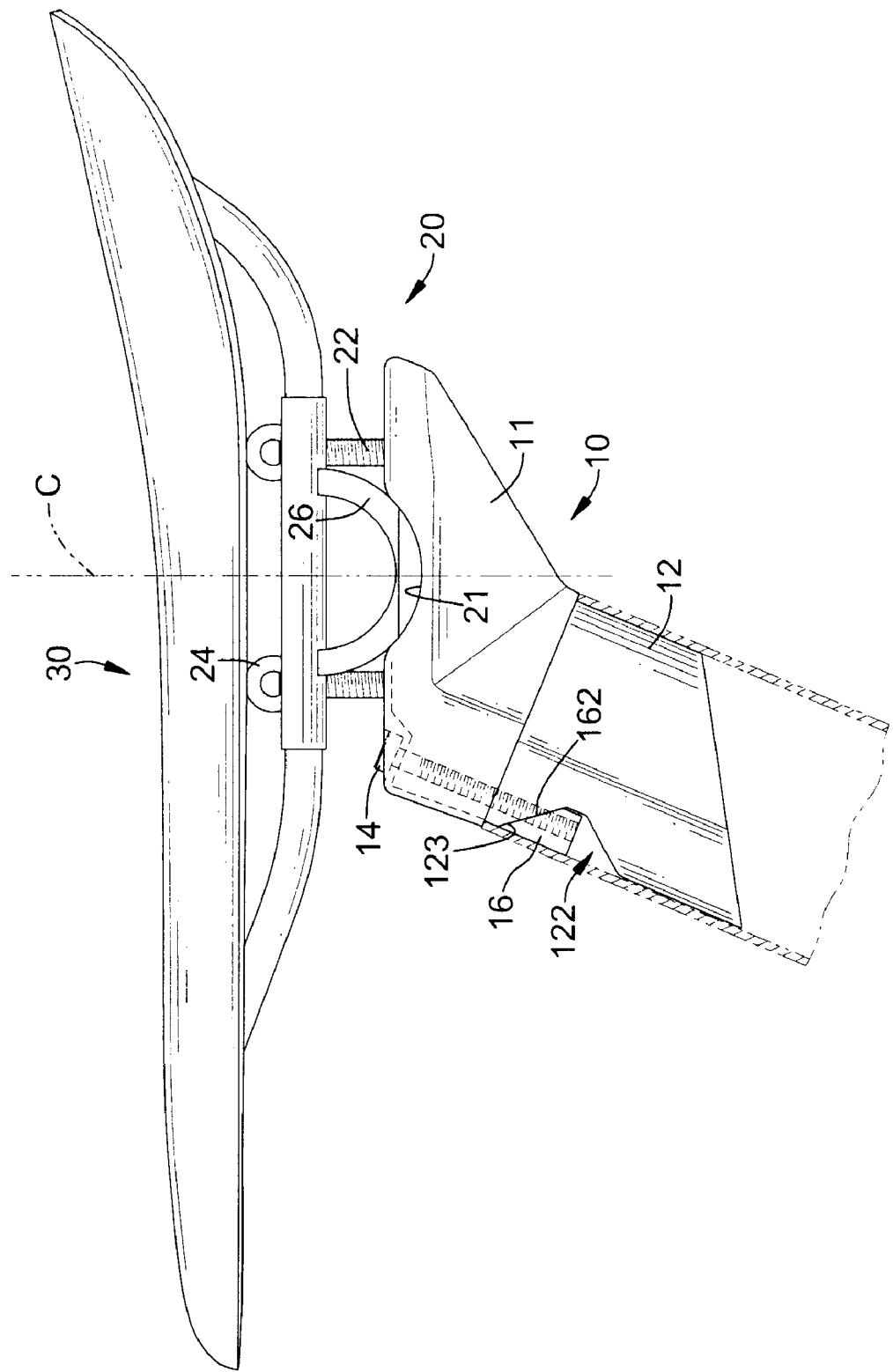
FIG. 4 is a side view in partial section of the holding assembly in FIG. 1 combined with a seat tube of a bicycle frame.
Figure 5:
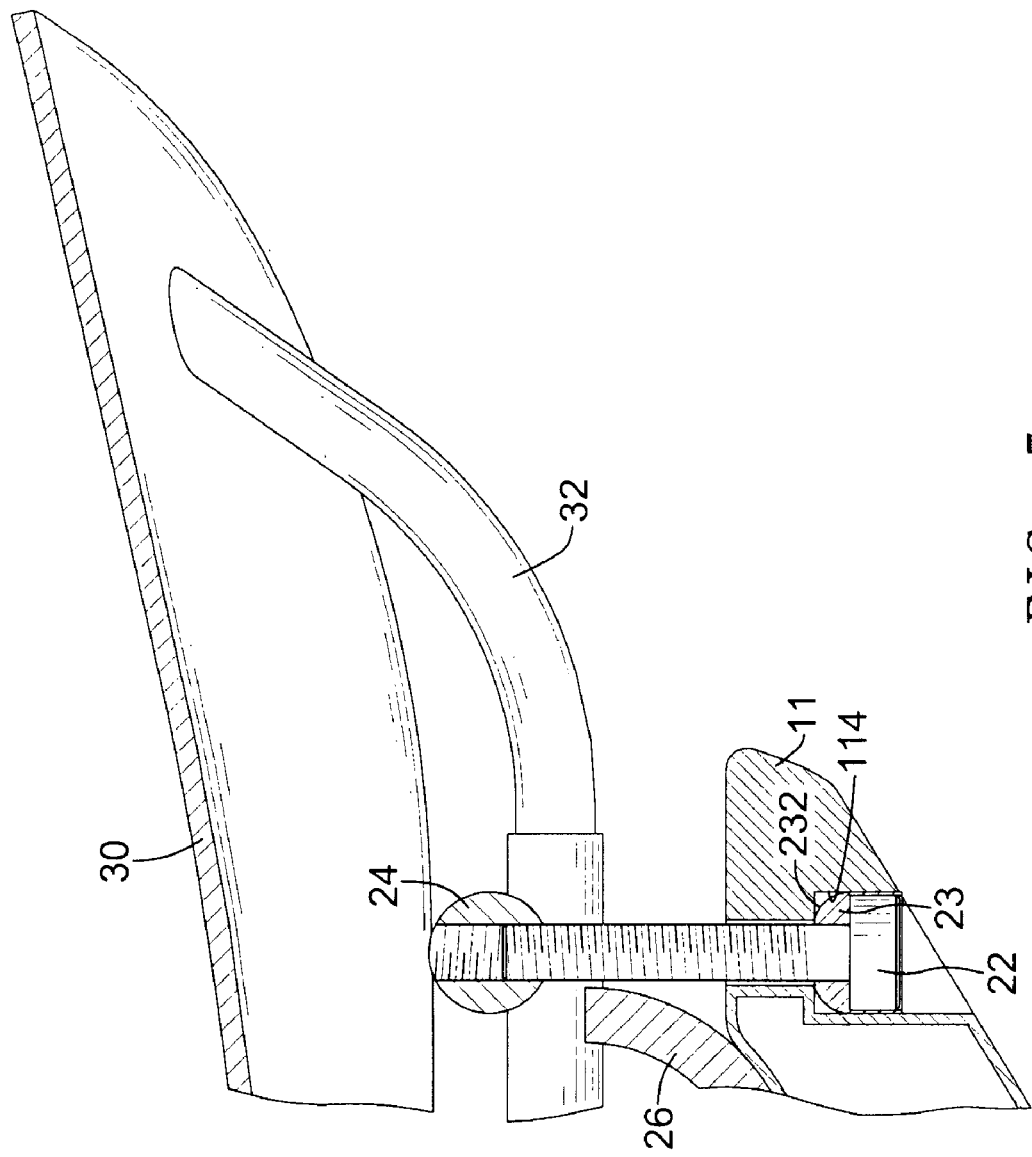
FIG. 5 is an enlarged side view in partial section of the connecting device of the holding assembly in FIG. 1.
Figure 6:
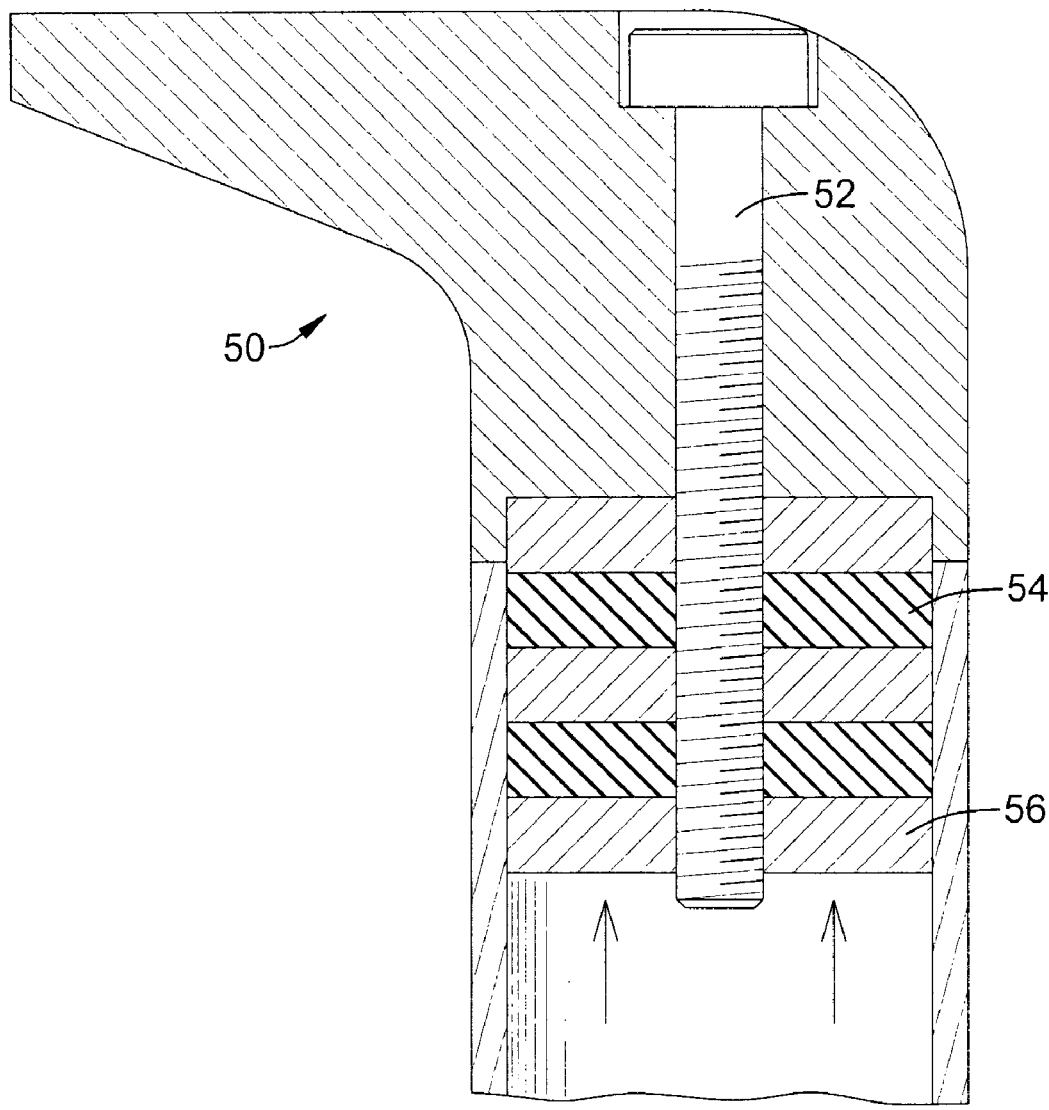
FIG. 6 is a side view in partial section of a conventional holding assembly for a seat of a bicycle in accordance with the prior art.

With further reference to FIGS. 4 and 5, the connecting device (20) comprises a connecting recess (21), two connecting bolts (22), two holding bars (24) and a supporting element (26). The connecting recess (21) is defined in the top of the connecting segment (11) and has a concave bottom. The connecting bolts (22) are mounted into the bottom and protrude from the top of the connecting segment (11). The holding bars (24) are connected respectively to the connecting bolts (22) in thread manners. In the preferred embodiment, each holding bar (24) has a threaded hole screwed with a corresponding connecting bolt (22). Each holding bar (24) further has two notches defined in a bottom of the holding bar (24) to hold tops of two connecting rods (32) on the seat (30) inside. The supporting element (26) is held in the connecting recess (21), may be U-shaped in cross section and has a top and a convex bottom. The top has multiple notches (262) aligning respectively with the notches in the holding bars (24) to securely hold the connecting rods (32) on the seat (30) in cooperation with the holding bars (24). The convex bottom matches with the concave bottom of the connecting recess (21). Accordingly, the seat (30) can be securely attached to the top of the connecting segment (11) of the securing base (10) by the connecting rods (32) being squeezed between the holding rods (24) and the supporting element (26). In addition, with the concave bottom of the connecting recess (21) and the convex bottom of the supporting element (26), the angle of the seat (30) relative to the securing base (10) is adjustable. Additionally, the connecting device (20) may further comprise two holding caps (23) mounted respectively around the connecting bolts (22). Each holding cap (23) is mounted in a through hole (114) defined through the connecting segment (11) and has a convex top (232) abutting with the inner surface of the corresponding through hole (114). With the convex tops (232) of the holding caps (23), the contacting area between the holding caps (23) and the through holes (114) is increased, and the combined force between the connecting bolts (22) and the connecting segment (11) is enhanced.

The engaging segment (12) is formed on and protrudes from the bottom of the connecting segment (11) and is inserted into the seat tube of the bicycle frame. In the preferred embodiment, the engaging segment (12) is inclinedly formed on and protrudes from the bottom of the connecting segment (11). The engaging segment (12) comprises a top, a bottom, an outer surface and an engaging recess (122). The top of the engaging segment (12) is formed on and protrudes from the bottom of the connecting segment (11). The engaging recess (122) is defined in the outer surface of the engaging segment (12) between the top and the bottom of the engaging segment (12) and has an inclined top surface (123) and an inclined bottom surface. With the engaging segment (12) being inclinedly formed on the connecting segment (11), the inclined top surface (123) and the inclined bottom surface of the engaging recess (122) are away from and misaligned with a center line (C) of the connecting segment (11).

The securing hole (112) is defined in the top of the securing base (10), extends through the connecting segment (11) and into the engaging segment (12) and communicates with the engaging recess (122) via the inclined top surface (123) of the engaging recess (122).

The securing bolt (14) is slidably and rotatably mounted in the securing hole (112), extends into the engaging recess (122) and has a threaded portion.

The engaging block (16) is moveably mounted in the engaging recess (122) between the inclined top surface (123) and the inclined bottom surface of the engaging recess (122) to prevent the engaging block (12) from moving out of the engaging recess (122) and has an inclined top surface (162) and a threaded portion. The inclined top surface (162) abuts with the inclined top surface (123) of the engaging recess (122). The threaded portion in the engaging block (16) may be a threaded hole that engages the threaded portion of the securing bolt (14) or may be an outer thread on the securing bolt (14).

When the securing bolt (14) is rotated with a tool, such as a screwdriver, the engaging block (16) will be move upward and outward from the engaging recess (122) due to the contacting inclined top surfaces (123,162). Consequently, the engaging block (16) and the engaging segment (12) of the securing base (10) will push against the inner surface of the seat tube in opposite directions. Accordingly, the securing base (10) can be securely connected to the seat tube, and the seat (30) is securely connected to the seat tube with the holding assembly.

In such an arrangement, the holding assembly in accordance with the present invention has a simplified structure and the cost for manufacturing and using the holding assembly is reduced. Because the engaging segment (12) and the engaging block (16) is held in the seat tube, the appearance of the seat tube is neat. Furthermore, because the inclined top surface (123) of the engaging recess (122) is away from and misaligned with the center line (C) of the connecting segment (11), the rider's weight is not applied directly to the engaging block (16). Thus, the engagement between the engaging block (16) and the seat tube is not easily damaged, and the combination between the holding assembly and the seat tube is enhanced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A holding assembly for a seat and a seat tube of a bicycle, comprising:
    a securing base having
        a top;
        a connecting segment formed at the top and having
            a top,
            a bottom, and
            a connecting device mounted on the top of the connecting segment, adapted to connect with the seat of the bicycle and having
                a connecting recess defined in the top of the connecting segment and having a concave bottom;
                two connecting bolts mounted into the bottom and protruding from the top of the connecting segment;
                two holding bars connected respectively to the connecting bolts in thread manners, and each holding bar having two notches defined in a bottom of the holding bar; and
                a supporting element held in the connecting recess and having
                    a top provided with multiple notches aligning respectively with the notches in the holding bars to be adapted to securely hold connecting rods on the seat in cooperation with the holding bars; and
                    a convex bottom matching with the concave bottom of the connecting recess;
        an engaging segment formed on and protruding from the bottom of the connecting segment, adapted to be inserted into the seat tube of the bicycle and having
            a top formed on and protruding from the bottom of the connecting segment;
            a bottom;
            an outer surface; and
            an engaging recess defined in the outer surface of the engaging segment between the top and the bottom of the engaging segment and having
                an inclined top surface; and
                an inclined bottom surface;
        a securing hole defined in the top of the securing base, extending through the connecting segment and into the engaging segment and communicating with the engaging recess via the inclined top surface of the engaging recess; and
        a securing bolt slidably and rotatably mounted in the securing hole, extending into the engaging recess and having a threaded portion; and
    an engaging block moveably mounted in the engaging recess between the inclined top surface and the bottom inclined bottom surface of the engaging recess to prevent the engaging block from moving out of the engaging recess and having an inclined top surface abutting with the inclined top surface of the engaging recess; and a threaded portion engaging the threaded portion on the securing bolt.

2. The holding assembly as claimed in claim 1, wherein the engaging segment is inclinedly formed on and protrudes from the bottom of the connecting segment to make the inclined top surface and the inclined bottom surface of the engaging recess being away from a center line of the connecting segment.

* * * * *